Figure 1:
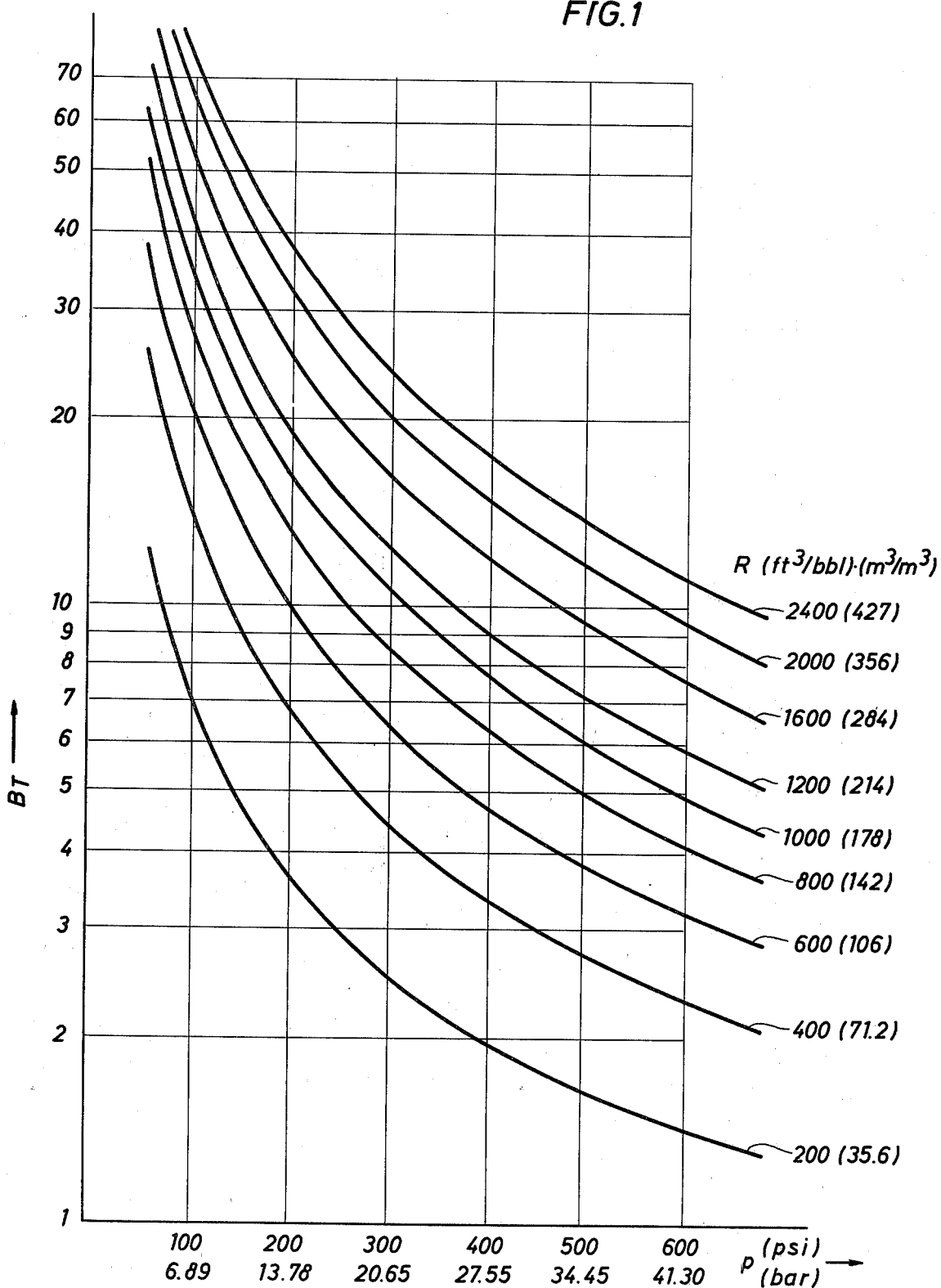

United States Patent [19]

Pichon

[11] 4,168,624

[45] Sep. 25, 1979

[54] METHOD AND APPARATUS FOR DETERMINING THE VOLUME FLOWRATE OF EACH PHASE IN A DIPHASE MIXTURE

[75] Inventor: Denis Pichon, Cesson, France

[73] Assignee: Schlumberger Technology Corporation, New York, N.Y.

[21] Appl. No.: 888,602

[22] Filed: Mar. 20, 1978

[30] Foreign Application Priority Data

Mar. 31, 1977 [FR] France ............................... 77 09649

[51] Int. Cl.² ............................................. G01F 13/00
[52] U.S. Cl. ......................................... 73/195; 73/19
[58] Field of Search ................. 73/19, 61 R, 195, 196, 73/194 R

[56] References Cited

U.S. PATENT DOCUMENTS

| | | | |
|---|---|---|---|
| 2,668,437 | 2/1954 | Patch ........................................ | 73/19 |
| 4,050,896 | 9/1977 | Raffel et al. ........................ | 73/195 X |
| 4,056,002 | 11/1977 | Arieh et al. ........................ | 73/195 X |
| 4,089,206 | 5/1978 | Raffel et al. ............................. | 73/19 |

*Primary Examiner*—Herbert Goldstein
*Attorney, Agent, or Firm*—David L. Moseley; William R. Sherman

[57] ABSTRACT

In accordance with an illustrative embodiment of the present invention, the respective volume flow rates of a gas and a liquid flowing in a conduit are determined by measuring the total volume flowrate, the pressure and the temperature of the two-phase mixture at first and second spaced points in the conduit, creating a pressure drop in the conduit between the first and second points, and determining the respective volume flowrates of the gas and liquid utilizing the measured values of total volume flowrates, pressures and temperatures. The invention has particular utility in well testing.

4 Claims, 2 Drawing Figures

METHOD AND APPARATUS FOR DETERMINING THE VOLUME FLOWRATE OF EACH PHASE IN A DIPHASE MIXTURE

This invention relates to a method and apparatus for determining the volume flowrates of a gas or a liquid forming a diphase mixture. The invention allows the determination of the respective volume flowrates of gas and liquid without separating the phases, and is particularly useful for the measurement of the respective volume flowrates of gas and crude oil during a production test of a well.

In prior art, the different fluids making up the diphase mixture are first separated and then the volume flowrate of each constituent is measured by a meter. As an example, it is known that the product leaving an oil well can contain gas and liquid which is generally crude oil sometimes mixed with water. During the initial testing of a well prior to production, the emerging liquid is almost exclusively crude oil, water being present in the mixture only in a very small proportion, of the order of a few percent. For these initial tests, the water present in the crude oil can thus be considered negligible.

As the exit of an oil well one first finds a safety valve making it possible to rapidly close the well in the event of sudden eruption, an expansion valve to reduce the pressure of the gas-liquid mixture leaving the well, sometimes a heater to prevent the formation of snow or ice caused by cooling of water which may be contained in the mixture and, finally, a separator to separate the gas from the liquid and measure the volume flowrates of the two phases separately.

A separator consists of an enclosed vessel, generally of cylindrical shape, in which the phases are separated by gravity. An outlet is provided for the gas at the top of the vessel and two outlets are provided at the bottom, one for crude oil and the other for water. As the specific gravity of the oil is lower than that of water, the oil floats over the water. To separate them, one need only provide a transverse partition at the bottom of the vessel by means of a wall forming an overflow. When the level of the liquid reaches the top of the overflow, the oil flows over the wall and falls into an adjacent tank. A volume flowmeter is mounted at each of the outlets for gas, water and oil.

When the well is not yet in production and initial tests are being conducted, the gas and crude oil leaving the separator are burnt by means of special burners. When the well is in production, the gas and crude oil are stored separately.

The separators are rugged devices and volume flowrates are measured with an accuracy of the order of three to five percent. This accuracy is generally sufficient because crude oil is in fact a relatively impure product capable of containing, for example, sand, water in the form of an emulsion and dissolved gas. However, separators are heavy, their weight being about ten tons. They are also large and cumbersome: the vessel of a separator of ordinary size has a diameter of from one to two meters and a length of about six meters. In addition, this vessel is mounted on a metal structure which adds to the bulk of the equipment. In the case of offshore drilling, the separators must be transported to and installed on the drilling platforms. The weight and size of this equipment is thus a serious drawback. It may also be noted that, due to the well-determined dimensions of the separator, the processing capacity is limited, generally to the order of about ten thousand barrels per day, and this capacity is too low. It is thus necessary to replace the separator by a larger one. The relatively high cost of this equipment is also a disadvantage.

It is an object of the invention to provide improved methods and apparatus for measuring the respective flowrates of each phase in a diphase mixture without the separation of the phases. In-line measurements can thus be carried out directly. The apparatus in accordance with the invention is less costly than a separator, much ligher and very compact. Similarly, flow measurements can be carried out within a very wide range.

Accordingly, the invention provides a method for determining the volume flowrates of a gas and a liquid forming a diphase mixture flowing in a pipe, said method being characterized in that one measure the total volume flowrate, the pressure and the temperature of said diphase mixture at a first and a second point of said pipe, the pressure and/or temperature conditions of said mixture at said first and second points being different, and in that one determines the respective volume flowrates of the gas and the liquid on the basis of the measured values of total volume flowrates, pressure and temperature.

According to one feature of the method of the invention, the pressure of the diphase mixture at the second measurement point located downstream of the first point is advantageously lower than the pressure of the mixture at said first point.

According to another feature of the present invention, a pressure drop is created between the first and second point in the pipe, this pressure drop being adjustable to allow for the making of several measurements at the second point in the pipe.

Another object of the invention is to provide an apparatus for determining the volume flowrates of a gas and a liquid forming a diphase mixture flowing in a pipe, said apparatus including a first and a second volume flowmeter placed respectively at a first and second location in said pipe such that the values of the volume flowrate of said diphase mixture at said locations are different, and means for measuring the pressure and temperature of said diphase mixture at said locations. In a preferred embodiment, the apparatus includes means between the first and second locations in the pipe for creating a pressure drop in the diphase mixture, such means including an adjustable control valve.

According to another feature of the invention, the volume flowmeters are advantageously of the axial impeller type.

According to a further feature of the invention, the apparatus can include, if necessary, means for making substantially uniform the diphase mixture located upstream of the volume flowmeters.

According to an additional feature, the apparatus can include means for sampling the mixture so as to allow determination of the thermodynamic parameters of each phase making up the mixture.

Figure 2:
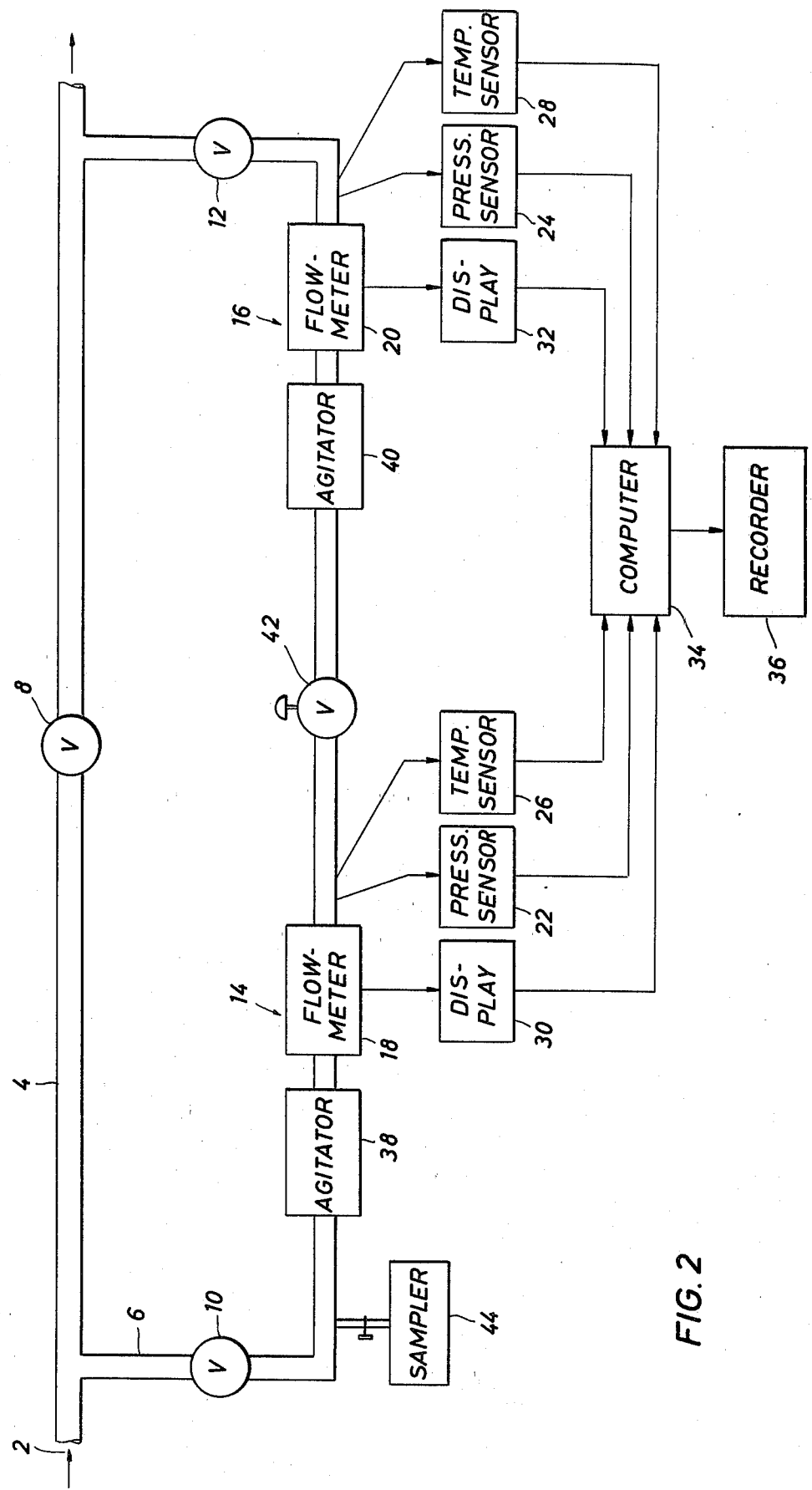

The invention has further objects, features and advantages which will become more clearly apparent in connection with the following detailed description, taken with reference to the appended drawings in which:

FIG. 1 is a nomograph of curves allowing fast graphic utilization of measurement data; and FIG. 2 is a schematic representation of an embodiment of an apparatus in accordance with the invention.

According to the invention, the determination of volume flowrates of each phase of the diphase mixture takes place without phase separation. To accomplish this, and assuming that the mixture flows in a substantially uniform manner in a pipeline, one measures the total volume flowrates of the mixture at first and second spaced points in the pipe as well as the corresponding values of the pressure and temperature of the mixture at each point. The volume flowrates measured at the first and second points of the pipe must be different. To achieve this, the pressure and/or temperature of the mixture can be different between the two measurement points. The pressure upstream of the second measurement point can be lower than the pressure at the second point itself and, in this case, it is necessary to provide means for compressing the mixture between the first and the second point. However, it is more convenient for the pressure at the second measurement point to be lower than the pressure prevailing upstream. This is accomplished very easily by creating a pressure drop between the two measurement points. This pressure drop can be created, for example, by a flow restriction placed in the line between the two measurement points, for example, a control valve. In the latter case, the pressure drop is then adjustable, thus making it possible to check the difference in pressure between the two measurement points. In the event of a variation in pressure, the temperature of the mixture can be constant or variable.

The variation in the volume flowrate of the mixture in accordance with pressure and/or temperature depends on the respective percentages of gas and liquid present in the diphase mixture. In fact, if the percentage of gas present in the mixture is very high, the variation in the volume of the mixture in accordance with pressure and temperature conditions is relatively large. Conversely, if the percentage of gas present in the mixture is low, the variation in the volume of the mixture with pressure and temperature is relatively small because the liquid volume variation is small compared with the corresponding gas volume variation. In the extreme case, if the mixture contains only liquid, the volume variation would be reduced to that due to the outlet of any dissolved gases. Likewise, if the mixture contained only gas, the relative volume variation would, as a first approximation, be proportional to the relative pressure variation at constant temperature. In actuality, an intermediate variation between these two extremes will be obtained.

Knowing the volume flowrates of the mixture at two points in the pipeline, for a given pressure and temperature, it is possible to deduce the percentage of gas present in the mixture.

Moreover, knowing the total flowrate for a given pressure and temperature, one can easily deduce the respective volume flowrates of gas and liquid present in the mixture.

It must be assumed that the mixture is homogeneous. If such is not the case, means can be provided upstream of each of the measurement means to make the mixture homogeneous.

Physical phenomena involved in the method of the invention can be expressed as equations through the use of the physical properties of fluids as well as their conventional thermodynamic parameters. As an example, there is given below the equations relating to a gas-crude oil mixture employing parameters and the notations customarily used in this field. The parameters and the thermodynamic functions described further below appear, for example, in the work entitled "Letter Symbols For Petroleum Reservoir Engineering, Natural Gas Engineering and Well Logging Quantities," 1965 publication by the Society of Petroleum Engineers, AIME.

To establish the above-mentioned equations, it is necesary to define the following parameters:

$q_o$: designates the volume flowrate (in m³/h) of crude oil under storage conditions, i.e. the temperature and pressure conditions under which crude oil is stored.

$q_g$: designates the volume flowrate (in m³/h) of gas under standard conditions. These conditions are defined by convention which will depend on the countries of reference. Generally, standard pressure and temperature conditions are respectively one atmosphere and fifteen degrees Celsius.

R: in a dimensionless parameter representing the ratio of gas flow $q_g$ to crude oil flow $q_o$.

$q_{t1}$: represents the total volume flowrate of the mixture (in m³/h) measured at a first point in the pipeline, the mixture being at the pressure $p_1$ and at the temperature $T_1$.

$q_{t2}$: represents the total volume flowrate of the mixture (in m³/h) measured at a second point in the pipeline, the diphase mixture being at the pressure $p_2$ and the temperature $T_2$.

$B_o$: is the volume factor of crude oil at the pressure p and at the temperature T. This is a dimensionless parameter. It represents the ratio of the crude oil volume with dissolved gas to the storage crude oil unit volume (generally one m³). It may be stated more simply that $B_o$ is the crude oil volume with dissolved gas which, after degassing, gives the storage crude oil unit volume. $B_o$ depends on the nature of the oil and the gas, on the pressure and on the temperature.

$B_g$: is the volume factor of gas at the pressure p and temperature T. It is a dimensionless parameter. It represents the ratio of the volume of gas occupied at the pressure p and at the temperature T to the unit volume of gas under standard conditions. It may also be stated that $B_g$ is the volume occupied at the pressure p and the temperature T by the unit volume of gas under standard conditions.

$R_s$: represents the ratio of the volume, under standard conditions, of dissolved gas to the storage crude oil unit volume at the pressure p and the temperature T. This is a dimensionless parameter.

$B_t$: is the total volume factor. It is dimensionless and represents the ratio of the total volume at the pressure p and the temperature T of the free gas and of the crude oil to the storage crude oil unit volume (in general one m³).

It may be demonstrated that the preceding parameters are related by the following equation:

$$B_t = B_o + (R - R_s)B_g \quad (1)$$

Referring to the preceding definition of the total volume factor $B_t$, and if the indices 1 and 2 are assigned respectively to the first and second measurement points in the pipeline, the following relations are obtained:

$$q_{t1} = q_o B_{t1} \quad (2)$$

$$q_{t2} = q_o B_{t2} \quad (3)$$

Combining the two equations (2) and (3) with the equation (1), one obtains:

$$q_{t1} = q_o [B_{o1} + (R - R_{s1}) B_{g1}] \quad (4)$$

$$q_{t2} = q_o [B_{o2} + (R - R_{s2}) B_{g2}] \quad (5)$$

According to the method of the invention, the values $q_{t1}$, $p_1$, $T_1$, and $q_{t2}$, $p_2$, $T_2$ are measured.

The values to be determined are $q_o$ and $q_g$ or even $q_o$ and R since the latter is equal to the ratio of $q_g$ to $q_o$.

$B_o$, $B_g$, $R_s$ and $B_t$ are conventional thermodynamic parameters which are known in accordance with pressure p and temperature T either by the laboratory study of samples of crude oil and gas making up the diphase mixture or by approximations using conventional correlations known to those skilled in the art and given, for example, in the work entitled: "Production Petroleum Handbook," Volume II, published by McGraw-Hill Book Company, 1962, specially Chapters 17 and 18.

The equations (4) and (5) constitute a system of two equations with two unknowns $q_o$ and R. This system can be solved by any suitable method. Calculations can be carried out for example by means of a real-time or off-line computer programmed for the solution of this system of equations. When more rapid processing of measurement results is desired, it is possible to use a graphic solution method utilizing the nomograph shown in FIG. 1.

FIG. 1 is a nomograph of curves in semilogarithmic coordinates representing the variations in the total volume factor $B_t$ as a function of the pressure p expressed in psi, i.e. pounds per square inch, and also in bars. These curves represent the parameter $B_t$ given by the equation (1) as a function of pressure, firstly for different values of the ratio R and secondly assuming that the temperatures $T_1$ and $T_2$ are equal at the two measurement points in the pipe. This assumption is altogether permissible in practice if these two measurement points are near each other. The values of the ratio R are given in FIG. 1 in cubic feet per barrel (ft$^3$/bbl) because this is the unit currently used in practice, but also in m$^3$/m$^3$ (dimensionless value) by the numbers indicated in parentheses.

The graphic solution method is based upon the fact that if one takes the ratio term by term of the equations (2) and (3), one obtains the following equality:

$$q_{t1}/q_{t2} = B_{t1}/B_{t2}$$

The values measured experimentally are $q_{t1}$, $p_1$, $T_1$ and $q_{t2}$, $p_2$, $T_2$.

On a transparent paper, using the same scales as those of the nomograph of curves $B_t$, the following two points are plotted: abscissa $p_1$—ordinate 1 and abscissa $p_2$—ordinate $q_{t2}/q_{t1}$. The transparent paper is moved parallel to the axis of ordinates and one determines the curve on which the two points fit. The value of the corresponding ratio R, as well as the value of the factor $B_{t1}$ corresponding to $p_1$, are read. The storage oil flowrate $q_o$ is then obtained by taking the ratio of $q_{t1}$ to $B_{t1}$.

Accuracy can be improved by varying the pressure drop between the two measurement points on the pipeline. It is thus possible to create, at the level of the second measurement point, a third pressure $p_3$ to which corresponds a measured volume flowrate $q_{t3}$. The following points are then placed on the transparent paper: abscissa $p_1$—ordinate 1; abscissa $p_2$—ordinate $q_{t2}/q_{t1}$ and abscissa $p_3$—ordinate $q_{t3}/q_{t1}$.

One then determines the curve of the nomograph on which these three points fit and the above procedure is used again.

FIG. 2 represents schematically an embodiment of an apparatus for determining the volume flowrate of two constituents of a diphase mixture. The diphase mixture containing a liquid phase and a gaseous phase enters at 2 into a main pipe 4 onto which is branched a secondary pipe 6 comprising the measurement apparatus. It is to be noted that this arrangement is optional and that the measurement apparatus may be connected directly in the main pipe 4.

The main pipe 4 includes a valve 8, and the secondary pipe 6 includes two valves 10 and 12 allowing the flow of the diphase mixture into the measurement apparatus. For this purpose, the valve 8 is closed and valves 10 and 12 are opened. The measurements are carried out at two points 14 and 16 on the secondary pipe 6. At each of these two locations 14 and 16 the pipe is equipped with means, 18 and 20 respectively, for measuring the volume flowrates of the diphase mixture, pressure sensors 22 and 24, and temperature sensors 26 and 28. The volume flowrate values that are measured can be displayed by means of instruments 30 and 32 connected to the flowmeters 14 and 16. The measured values of flowrate, pressure and temperature can be applied to the inputs of a computer which has been programmed to solve the system of two equations (4) and (5). To achieve this, the meters 30 and 32 are equipped with means for transmitting their data to a computer 34. The pressure and temperature data are also transmitted to the computer 34 by means of pressure sensors 22 and 24 and the temperature sensors 26 and 28. The computer 34 can be connected to display means 36, such as a recorder, for example.

When the diphase mixture is not substantially homogeneous, means 38 and 40 are provided upstream of each flowmeter 18 and 20 to make the diphase mixture homogeneous. These means can consist, for example, of agitators or emulsifiers.

At the two measurement locations 14 and 16 of the line, the volume flowrates must be different. In the described embodiment, this is accomplished by creating a pressure variation between the two measurement points. This pressure variation may be achieved quite naturally when the diphase mixture undergoes a pressure drop between the two measurement points, for example if these two points are far from each other, or if the volume flow measurement means 18 at the first point 14 of the pipe themselves creates a sufficient pressure drop. It is advantageous, however, to place a control valve 42 between the two flowmeters 18 and 20. This valve makes it possible to adjust the pressure drop of the diphase mixture between the two measurement points 14 and 16.

The volume flow measurement means 18 and 20 can consist advantageously of axial-impeller flowmeters. If the pressure drop introduced by the first impeller is sufficient, the second impeller can be mounted, for example, on the same shaft as the first impeller and immediately after. As an example, it is possible to use the flowmeters marketed by the company Compteurs Schlumberger under the trade name of "Fluxi."

To allow laboratory determination of the thermodynamic parameters of the two phases of the diphase mixture, means 44 may be connected to the secondary pipe 6 to take samples of the diphase mixture. These means are known and are used currently in actual practice. The laboratory analysis of the samples makes it possible to determine these thermodynamic parameters.

While particular embodiments of the present invention have been shown and described, it is apparent that changes and modifications may be made without departing from the invention in its broader aspects. In particular, an example relative to the petroleum industry has been described, but it goes without saying that the invention is applicable to any determination of the volume flowrates of the two phases of a diphase mixture, whatever the mixture. In addition, in the described example, the flow variations are obtained mainly by varying the pressure of the mixture between the two measurement points, but it is quite evident that a variation in the temperature of the mixture can be used, either separately or in conjunction with a pressure variation. Furthermore, the liquid phase of the diphase mixture can include solid particles in suspension, such as sand or gravel entrained in crude oil flowing of a well. In such case, and according to the present invention, the liquid phase will be formed by the liquid itself and by the suspended solids, with the latter being considered as a contaminant or a pollutant. Accordingly, the expression "liquid" or "liquid phase" as used herein applies to a liquid or liquids, including solid particles.

Thus, it is the aim of the appended claims to cover all such changes and modifications falling within the true spirit and scope of the present invention.

I claim:
1. A method for continuously determining the volume flowrates of a gas and a liquid forming a substantially homogeneous diphase mixture flowing in a pipe, said method comprising the steps of: measuring the total volume flowrate, the pressure and the temperature of said diphase mixture at a first point in said pipe; varying the pressure of said diphase mixture between said first point and a second point in said pipe located downstream of said first point by creating a pressure drop in the diphase mixture between said first and second points in said pipe so as to lower the pressure between the first and second points; adjusting said pressure drop to obtain successively two different values of the pressure of the diphase mixture at said second point, and measuring the total volume flowrates and the temperatures of said mixture for said two different pressure values; and determining the respective volume flowrates of the gas and the liquid on the basis of the measured values of total volume flowrates, pressures and temperatures.

2. A method for continuously determining the volume flowrates of a gas and a liquid forming a substantially homogeneous diphase mixture flowing in a pipe, said method comprising the steps of: measuring the total volume flowrate, the pressure and the temperature of said diphase mixture at a first point in said pipe; varying the pressure of said diphase mixture between said first point and a second point in said pipe located downstream of said first point; measuring the total volume flowrate, the pressure and the temperature of the diphase mixture at said second point; determining the respective volume flowrates of the gas and the liquid on the basis of the measured values of total volume flowrates, pressures and temperatures, said volume flowrates of the gas and liquid being determined on the basis of the following two equations:

$$q_{t1} = q_o [B_{o1} + (R - R_{s1}) B_{g1}]$$

$$q_{t2} = q_o [B_{o2} (R - R_{s2}) B_{g2}]$$

in which the indices 1 and 2 correspond respectively to said first and second points, and R designates the ratio of the volume flowrates $q_g$ of $q_o$ of the gas and liquid respectively, $B_g$, $B_o$, and $R_s$ designate thermodynamic characteristics of the gas and liquid which vary as a function of pressure and temperature, and $q_t$ designates the total volume flowrate of the mixture; wherein said thermodynamic characteristics are determined by sampling said mixture and analysis of said samples.

3. The method of claim 2 wherein the varying step comprises creating a pressure drop in said diphase mixture between said first and second points so as to lower the pressure between said first and second points.

4. The method of claim 3 including the further steps of adjusting said pressure drop to obtain successively two different values of the pressure of said mixture at said second point, and measuring the total volume flowrates and the temperatures of said mixture for said two different pressure values.

* * * * *